United States Patent [19]

Eavenson, Sr. et al.

[11] Patent Number: 5,337,849

[45] Date of Patent: Aug. 16, 1994

[54] AXLE MOUNTING MECHANISM

[75] Inventors: Jimmy N. Eavenson, Sr., Juneau; Robert N. Behrens, Beaver Dam, both of Wis.; Henry Friesen, Niagara Falls; Nicholas Hamm, Vineland, both of Canada

[73] Assignee: Deere & Company, Moline, Ill.

[21] Appl. No.: 931,247

[22] Filed: Aug. 17, 1992

[51] Int. Cl.5 .............................................. B62D 61/10
[52] U.S. Cl. .................................. 180/24.12; 180/344; 180/348; 180/351; 180/376; 180/384; 180/385
[58] Field of Search ............... 180/337, 344, 348, 350, 180/351, 357, 376, 383, 385, 373, 384, 24.12

[56] References Cited

U.S. PATENT DOCUMENTS

| | | | |
|---|---|---|---|
| 1,740,810 | 12/1929 | Davies | 180/337 |
| 2,079,290 | 5/1937 | Jencick | 180/357 |
| 2,831,544 | 4/1958 | Dunn et al. | 180/9.1 |
| 3,447,621 | 6/1969 | Schoonover | 180/9.52 |
| 3,454,109 | 7/1969 | Roberts | 172/781 |
| 3,938,605 | 2/1976 | Koch | 180/9.5 |
| 4,127,180 | 11/1978 | Coffman | 180/6.48 |
| 4,328,877 | 5/1982 | Ballard | 180/373 |
| 4,706,770 | 11/1987 | Simon | 180/24.02 |

OTHER PUBLICATIONS

Advertising brochure entitled: "Where The Road Ends, The Stories Begin"; published by Polaris Industries in 1989, front cover and pp. 8, 9 and 10.

Primary Examiner—Eric Culbreth

[57] ABSTRACT

A mechanism for mounting an axle to a vehicle, and including a power output shaft drivingly coupled with a generally cylindrical coupler which is drivingly coupled with a first sleeve. A first axle is coupled for rotation with the first sleeve, and a first ground engaging wheel is coupled for rotation with the first axle and is thereby operatively driven by the output shaft. A first axle housing rotatably supporting the first axle is generally rigidly and releasably fixed to the frame of the vehicle. A first sprocket is fixed for rotation with the first sleeve, and a chain operatively extends between the first sprocket and a second sprocket which is fixed for rotation with a second sleeve. The second sleeve is operatively coupled with a second axle rotatably supported by a second axle housing, and therefore a second ground engaging wheel is driven with the first ground engaging wheel. An adjustable tensioning mechanism includes a bolt and nut for shifting the second axle housing with respect to the first axle housing to thereby adjust the tension in the chain.

15 Claims, 4 Drawing Sheets

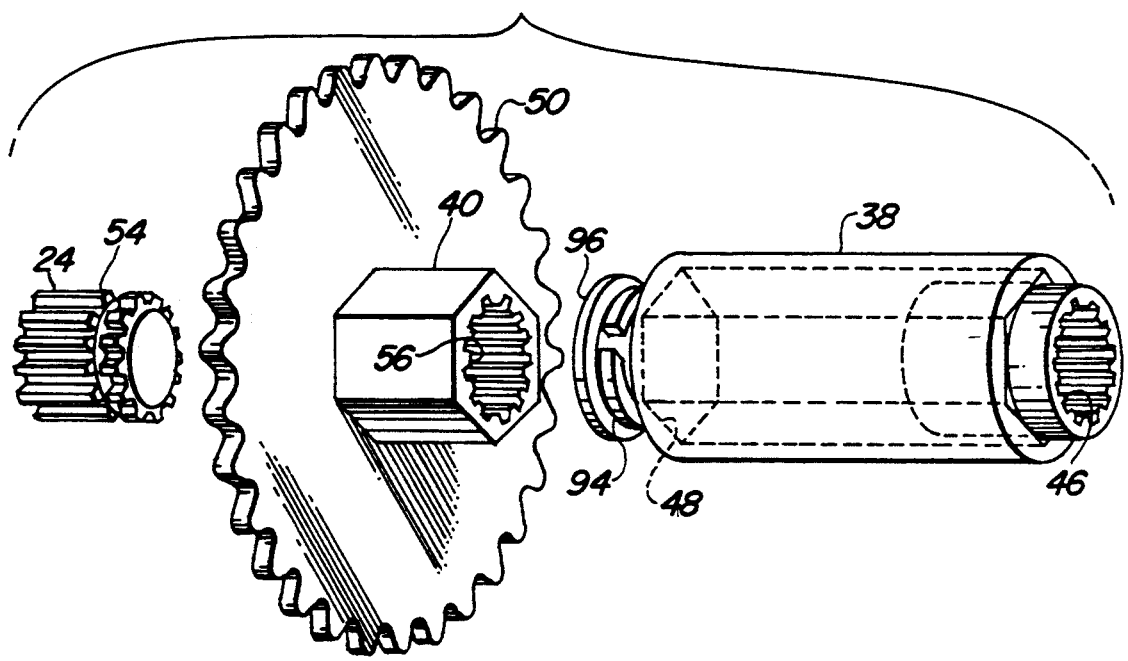
Fig. 5
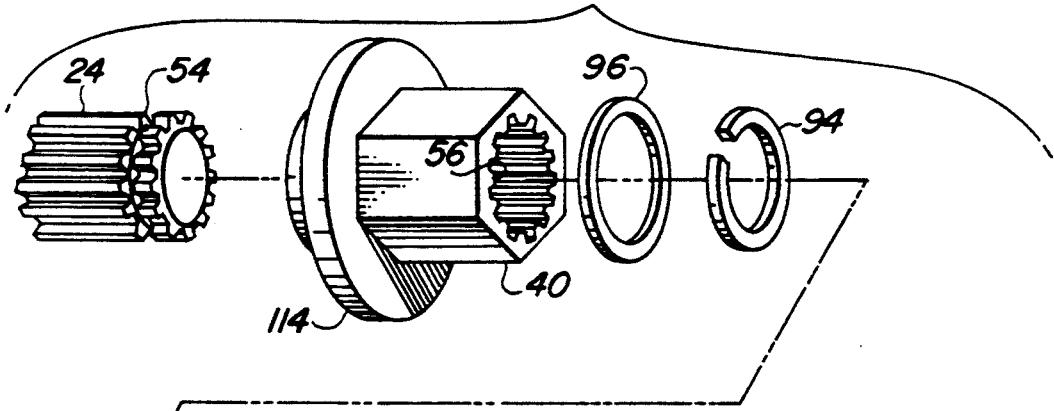
Fig. 6
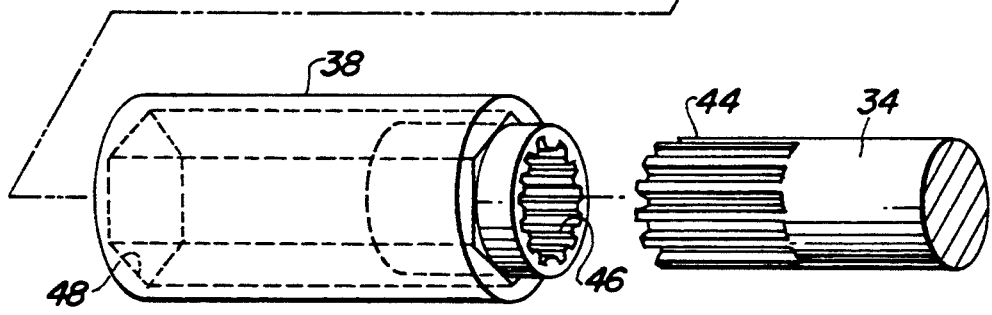

AXLE MOUNTING MECHANISM

BACKGROUND OF THE INVENTION

This invention relates to mechanisms for mounting an axle to a vehicle frame.

A first type of axle mounting mechanism is described in U.S. Pat. No. 4,706,770 and includes four rear wheels which are driven by the vehicle's power source. Chains operatively link the front driven wheels with respective rear driven wheels. As best seen in FIGS. 2 and 3 of '770, axle support structures referred to by numerals 28, 30, 32 and 34 extend outwardly from the main frame members and serve to rotatably support respective axles. The axle support structures are welded to the main frame, and carry bearings which receive the respective axles. Inherent inaccuracies in the welding process and tolerance buildups can accumulate such that the axle support structure may actually carry the axle in misaligned position with respect to the differential shafts. Undesirable wear can occur between parts when excessive misalignment occurs. The axle assemblies are relatively exposed, such that rust or other deterioration may occur on the various parts after prolonged use. When service is required, as for maintenance or replacement of a bearing or axle, the axle must be forced out from within the bearings, and disassembly or re-assembly may be difficult if the various parts are in a deteriorated condition. Furthermore, a separate idler mechanism is typically provided for tightening or tensioning the drive chain during vehicle operation.

Another type of axle mounting mechanism provides an enclosed axle support which is bolted directly to the housing of the transmission, and extends from the transmission to a location just inboard of the wheel. The axle support houses bearings which rotatably receive the axle. Alignment of the axle with the transmission output shaft is relatively accurate, since the mounting mechanism is bolted directly to the transmission housing. However, since the axle support mechanism is entirely enclosed, a mechanism such as a sprocket and chain can not be coupled to the axle in a manner as shown in U.S. Pat. No. 4,706,770 for transmitting rotational motion to another axle.

It would therefore be desirable to provide an axle support and mounting mechanism which serves to accurately align the axle with the vehicle's transmission output shaft. It would be desirable for such a mechanism to be composed of relatively few parts and be easily assembled. It would be desirable for such a mechanism to generally prevent rust and deterioration of the axle, and allow the mechanism to be easily disassembled and re-assembled for maintenance purposes. It would be desirable for such a mechanism to allow for four wheel drive operation, and include parts that could also be assembled in a two wheel drive configuration. It would be desirable for such a mechanism to include an adjustable chain tensioning mechanism comprised of relatively few parts, and simple in construction such that manufacture and assembly costs are relatively low.

SUMMARY OF THE INVENTION

The preferred embodiment of the present invention provides a mechanism for mounting a vehicle axle. The vehicle includes a power source and an output shaft. A generally cylindrical coupler is coupled for rotation with the output shaft, and is drivingly engaged with a first sleeve having a first sprocket fixed thereto. The first sleeve is fixed for rotation with a first axle, which is rotatably supported by a pair of bearings within a first axle housing bolted to the vehicle frame. A chain operatively extends between the first sprocket and a second sprocket which is fixed to a second sleeve. The second sleeve is fixed for rotation with a second axle which is rotatably supported by a pair of bearings within a second axle housing bolted to the frame. A chain tensioning mechanism is provided and includes a bolt and nut arrangement which can be adjusted to vary the fore and aft position of the second axle housing to thereby adjust the tension in the chain. The axle housings are positioned within openings formed in the vehicle frame, and act to relatively precisely align the axle with the power output shaft.

BRIEF DESCRIPTION OF THE DRAWINGS

FIG. 5 is an exploded view of a portion of the axle support mechanism adapted for use with a four-wheel-drive vehicle.

FIG. 6 is an exploded view of a portion of the axle support mechanism adapted for use with a two-wheel-drive vehicle.

DESCRIPTION OF THE PREFERRED EMBODIMENT

Figure 2:
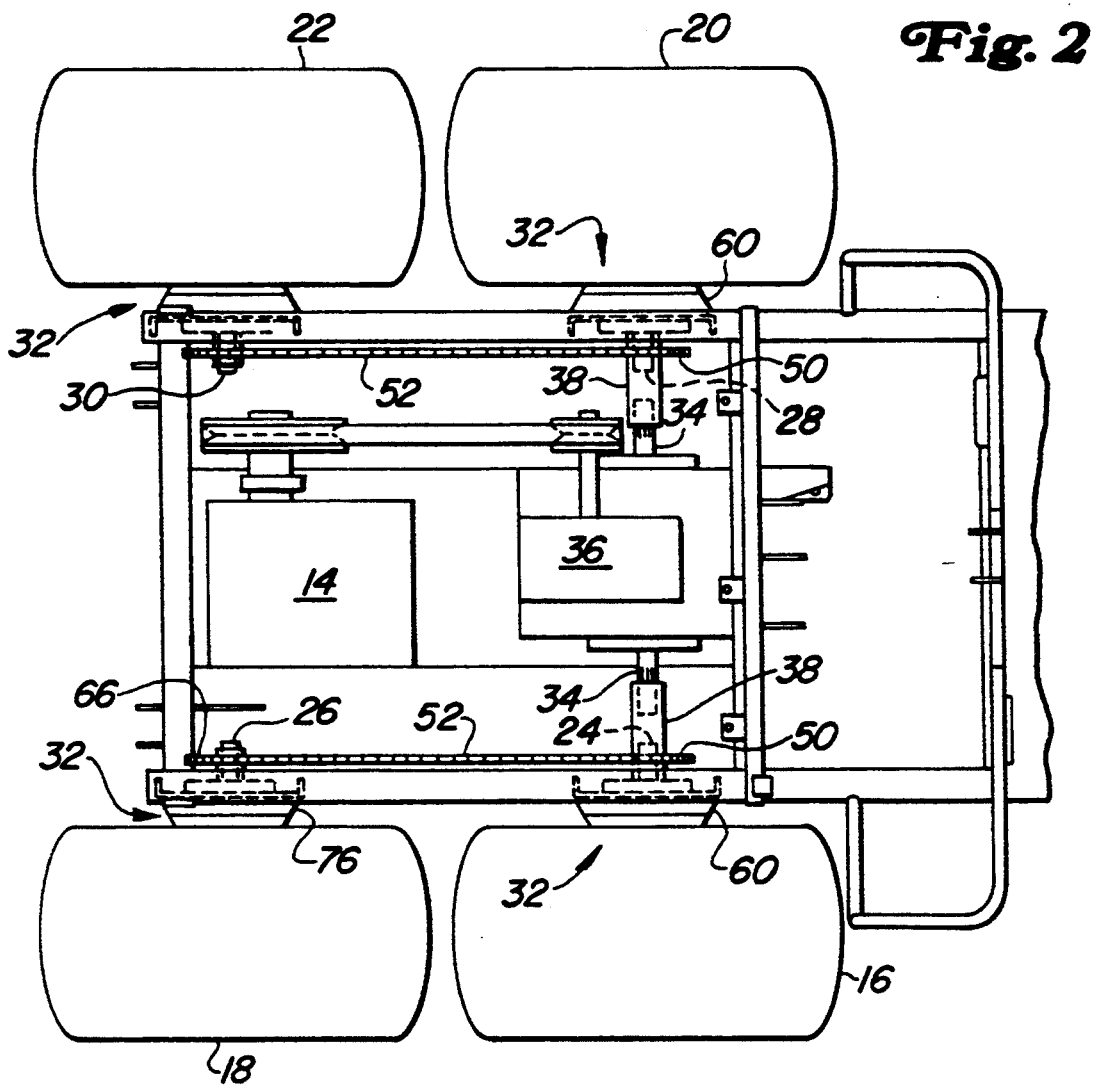
FIG. 2 is a plan view of the entire rear portion of a vehicle which includes a four-wheel-drive embodiment of the present invention.
Figure 1:
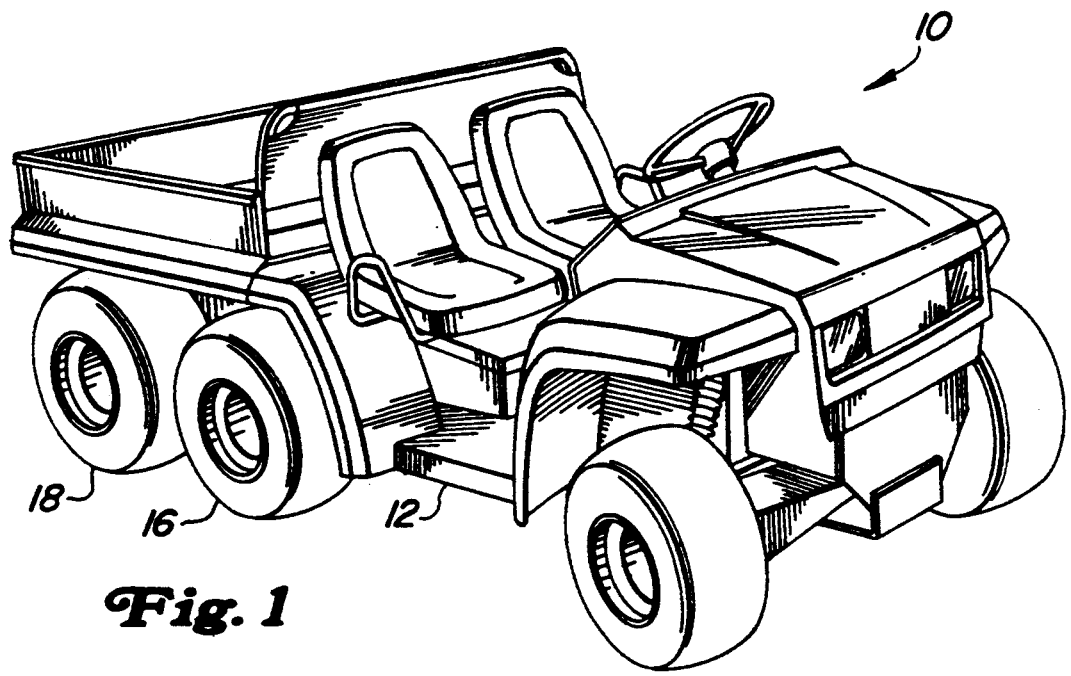
FIG. 1 is a perspective view of a vehicle with which the present invention may be used.
Figure 3:
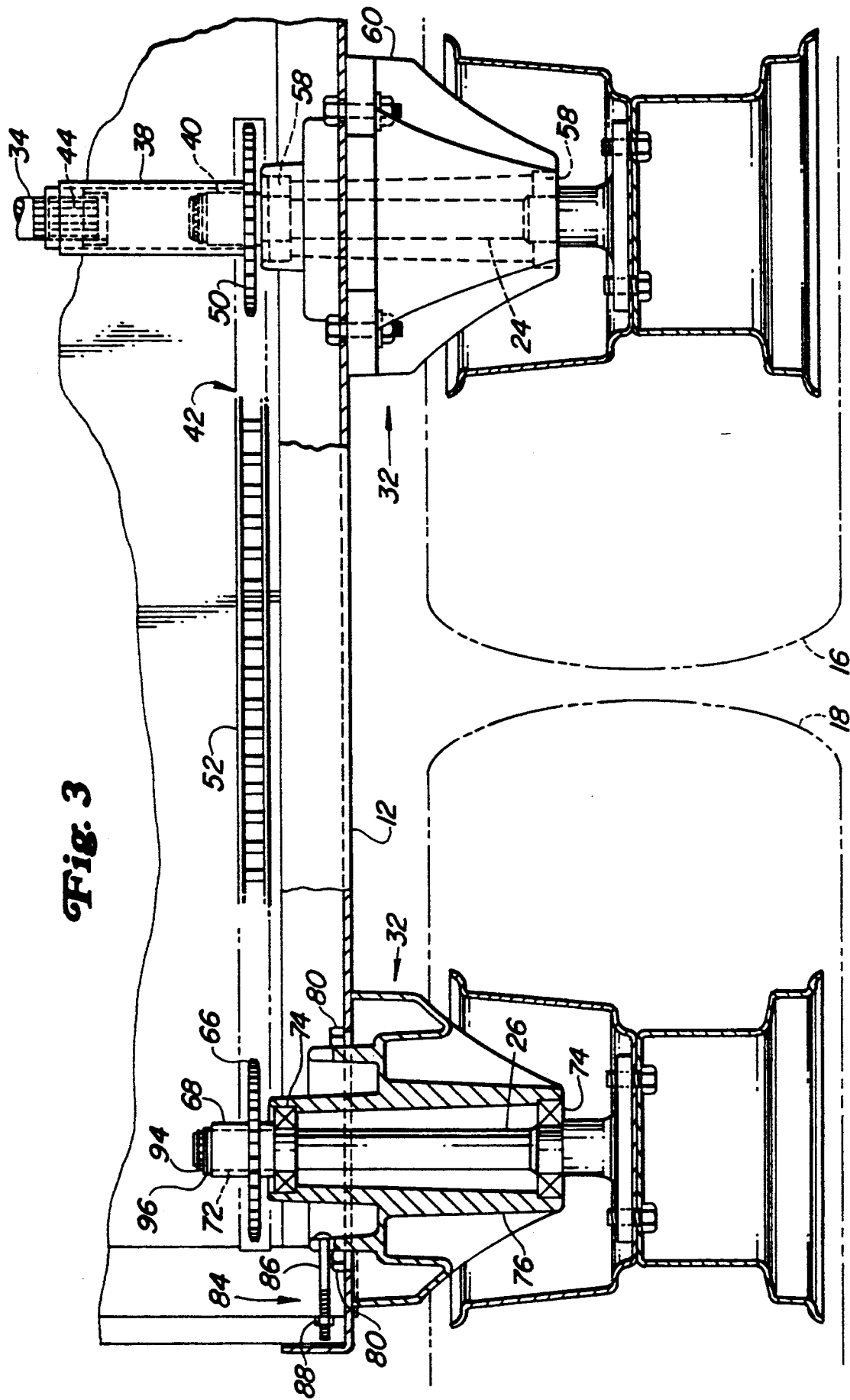
FIG. 3 is a plan view of the right side of a four-wheel-drive embodiment of the present invention, and showing a sectional view of the rearward axle housing.

Referring now to FIGS. 1 and 2, there is shown a six-wheeled vehicle 10 with which the present invention may be used, and which includes a frame 12, power source 14 and four driven wheels 16, 18, 20 and 22 which are non-steerable. As seen in FIGS. 2 and 3, respective axles 24, 26, 28 and 30 are coupled for rotation with each driven wheel 16, 18, 20 and 22. The present invention provides an axle support mechanism 32 which operatively mounts the axle 24, 26, 28 or 30 to the vehicle frame 12. Both the right and left sides of the vehicle 10 include generally identical axle mounting mechanisms according to the present invention, and therefore, for the sake of clarity and brevity, only the right side of the vehicle 10 will be described below. Each front axle 24 and 28 is coupled generally directly to an output shaft 34 of a transmission 36 via a coupler 38 and first sleeve 40. The rearward wheels 18 and 22 are coupled with the forward axles 24 and 28 via a chain and sprocket mechanism 42 for being driven with the forward wheels 16 and 20.

Figure 4:
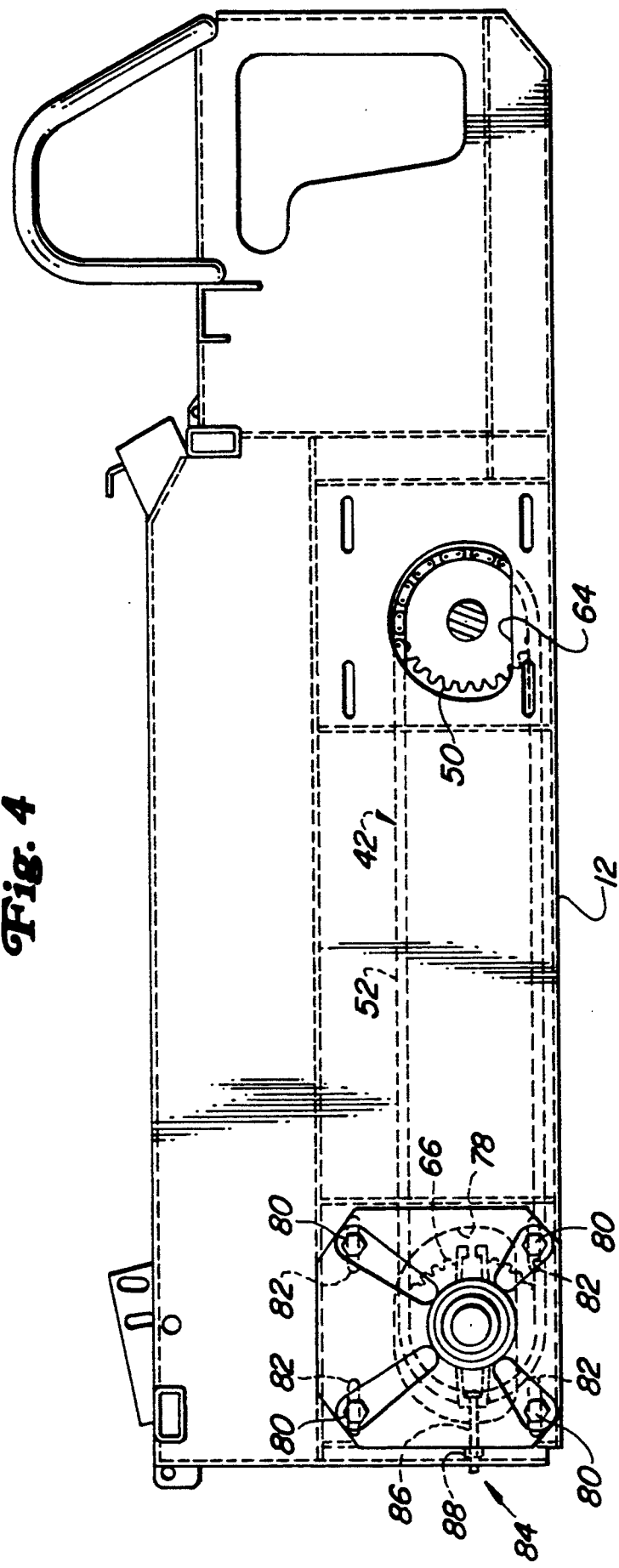
FIG. 4 is a side view of the rear portion of a vehicle having the four-wheel-drive embodiment of the present invention.

Referring now to FIG. 3, the axle support mechanism 32 is shown in greater detail. The output shaft 34 extends outwardly from the transmission 36, and includes a splined end portion 44. The splined end portion 44 of the output shaft 34 is received within a mating first opening 46 in a generally cylindrical coupler means 38. The shape of the opening 46 in the coupler 38 mates with the splined end 44 of the output shaft 34 such that the output shaft 34 and coupler 38 rotate together during operation. The coupler 38 includes a hex shaped opening 48 formed in the end portion opposite the output shaft 34, and receives a first sleeve 40 having a hex-shaped outer diameter. The hex shape of the first sleeve 40 mates with the shape of the coupler opening 48 to thereby cause the first sleeve 40 to rotate with the coupler 38 during vehicle operation. A first sprocket 50 is welded to the first sleeve 40 for transmitting rotational motion via a chain 52 to a similar axle mounting mechanism 32 located to the rear of the vehicle 10. A splined end portion 54 of a first axle means 24 is slidably received by a mating second opening 56 formed in the first sleeve 40 for transmitting rotational motion between the first sleeve 40 and first axle means 24. The coupler 38 and first sleeve 40 act as an attaching means for coupling the first axle 24 for rotation with the output shaft 34. The first axle means 24 is rotatably carried by a pair of bearings 58 within a first axle housing means 60. A "D" shaped portion of the axle housing 60 is located within a mating "D" shaped opening 64 (as best seen in FIG. 4) formed in the frame 12, and is securely bolted to the frame 12. The outer end portion of the axle 24 is coupled to the ground engaging wheel 16.

The chain 52 extends rearwardly from the first sprocket 50 to a second sprocket 66 fixed to a second sleeve 68. The second sleeve 68 includes a splined opening (which is identical to the splined opening 56 shown in FIG. 5) which matingly receives a splined end portion of a second axle (which is identical to the splined end portion 54 shown in FIG. 5). The second axle 26 is received by a pair of bearings 74 which are carried by a second axle housing means 76. The second axle housing 76 is slidably positioned within a housing slot 78, as best seen in FIG. 4. Bolts 80 are positioned within bolt slots 82 formed in the frame 12 for rigidly securing the second housing 76 to the vehicle frame 12. A chain tensioning means 84 is provided near the rear of the vehicle 10, and includes a tensioning bolt 86 which is coupled with the second axle housing 76. A nut 88 is threaded onto the tensioning bolt 86. When the bolts 80 which secure the second axle housing 76 to the frame 12 are loosened, the nut 88 can be tightened or loosened on the tensioning bolt 86 for causing the second axle housing 76 to shift fore and aft within the housing slot 78. Bolt slots 82 allow the bolts 80 to shift in the fore and aft directions. By adjusting the fore and aft position of the second axle housing 76 the tension or slack in the chain 52 can be adjusted. Once the desired tension has been applied to the chain 52, the bolts 80 can be re-tightened to secure the second axle housing 76 in operating condition. The present invention therefore includes a chain tensioning mechanism which eliminates the need for a separate idler mechanism, and is simple in construction such that it is easily assembled and easily adjusted.

During the assembly of the present invention the transmission 36 is coupled with the frame 12, and the coupler 38 is slid over the end portion of the output shaft 34. The first axle housing 60, bearings 58 and first axle 24 are preassembled, and the first sleeve 40 is slid onto the splined end portion of the first axle means 24. A snap ring 94 and washer 96 are received by the first sleeve 40 for securing the first sleeve 40 on the splined end portion 54 of the first axle 24. The first axle housing 60 is then placed within the corresponding "D" shaped opening 64 in the vehicle frame 12. As the first axle housing 60 enters the "D" shaped opening 64, the first sleeve 40 enters the hex shaped opening 48 formed in the coupler 38. The bolts 92 can then be tightened for securing the first axle housing 60 to the frame 12 for operation. The mating shapes of the transmission output shaft 34, the coupler 38, the first sleeve 40 and the first axle 24 act to transfer rotational motion such that the various parts are not required to be welded or otherwise permanently fastened to each other. The rear axle mounting mechanism is assembled in similar fashion. The axle housings 60 and 76 are relatively precisely manufactured, and therefore include fewer inaccuracies or misalignments than a welded steel structure which is welded to a vehicle frame. The "D" shaped opening 64 in the frame 12 is formed during the manufacturing process, and is precisely located relative to the portion of the frame 12 which supports the transmission 36. In this way, when the transmission housing, which is itself a precisely manufactured part, is placed in position within the frame 12 and the first axle housing 60 is positioned within the "D" shaped opening 64, the first axle 24 and the output shaft 34 become relatively precisely aligned.

The various parts of the front axle support mechanism are generally identical to the parts used by the rear axle support mechanism. For example, the respective sleeves 40 and 68, sprockets 50 and 66, axles 24 and 26, bearings 58 and 74, and axle housings 60 and 76 of the front and rear axle support mechanisms are identical parts. This commonality of parts between the front and rear axle support mechanisms reduces the number of parts required to manufacture and assemble the vehicle, thereby reducing the overall cost of the vehicle.

The present invention is also adapted to be utilized on a two-wheel-drive vehicle. FIGS. 5 and 6 illustrate the differences between the two-wheel and four-wheel-drive embodiments of the present invention. FIG. 5 is an exploded view of the coupler 38, first sleeve 40, first sprocket 50, and splined end portion 54 of the first axle means 24. The snap ring 94 and washer 96 which prevent the first sleeve 40 from coming off the end of the first axle 24 are also shown. FIG. 6 is an exploded view of the transmission output shaft 34, coupler 38, sleeve 40 and splined end portion 54 of the axle 24 according to an embodiment adapted for two-wheel-drive operation. The two-wheel-drive embodiment can be utilized on a vehicle having a pair of front steerable wheels and a pair of driven rear wheels, as opposed to the six wheel configuration shown in FIG. 1. The sleeve 40 shown in FIG. 6 does not include a sprocket, but instead includes a washer 114 welded to the outside diameter of the sleeve 40. Like the sprockets 50 and 66 of the four-wheel-drive embodiment described above, the washer 114 prevents or blocks the coupler 38 from shifting off the end of the output shaft 34 during operation. It is apparent from a comparison of the mechanisms shown in FIGS. 3 and 5 that the two mechanisms share many common parts. In fact, the main difference between the two embodiments is that the sleeves 40 and 68 of the four-wheel-drive embodiment have sprockets 50 and 66 welded thereto, and the sleeve 40 according to the two-wheel-drive configuration shown in FIG. 6 has a washer 114 welded to its outer diameter. The present invention therefore allows for commonality of parts between different vehicle designs, and the cost of manufacturing the vehicles is correspondingly reduced.

After extended use of the present invention, maintenance such as bearing or axle repair or replacement may be necessary. To service the axle mechanism 32, the housing 60 is unbolted and pulled from its opening 64 in the frame 12. The coupler 38 and sleeve 40 can then be removed for service, and the axle 24 can also be removed from the axle housing 60. As seen in FIG. 3, the axles 24 and 26 include several sections each having different diameters. The sections generally increase in size as the axle 24 extends outwardly from the vehicle 10. The axle 24 can therefore more easily be forced out of the bearings 58. Furthermore, since the axle 24 is generally enclosed by the axle housing 60 and the sleeve 40, rust or other deterioration from exposure to the environment is generally hindered such that removal and reinsertion of the axle 24 within the bearings 58 is generally facilitated.

We claim:

1. A vehicle axle mechanism, said vehicle having a frame, said mechanism comprising:
    a power output shaft driven by a power source carried by the vehicle,
    an attachment means having first and second openings, said first opening being adapted to receive the output shaft, said first opening and output shaft having mating shapes which prevent the attachment means from rotating relative to the output shaft,
    an axle means received by the second opening in the attachment means, said second opening and axle means having mating shapes which prevent the attachment means from rotating relative to the output shaft, a ground engaging wheel being coupled for rotation with the axle means,
    an axle housing means for rotatably supporting the axle means, said axle housing means being generally rigidly and releasably fixed to the frame of the vehicle, a portion of the axle housing being positioned within an opening in the frame, said portion of the axle housing and opening in the frame having generally mating shapes which locate the axle in alignment with the output shaft whenever the housing is positioned within the opening, and
    wherein said attachment means further comprises:
        a coupler which is operatively receives output shaft, said first opening being formed in the coupler,
        a sleeve which operatively receives the axle means, said second opening being formed in the sleeve,
        said coupler and sleeve being slidably coupled together and having mating shapes formed therein for preventing relative rotation between the coupler and sleeve.

2. The invention of claim 1, wherein said opening and the portion of the axle housing means within the opening have a common mating shape for precisely locating the axle means relative to the output shaft.

3. The invention of claim 1, wherein said portion of the axle housing means fits relatively snugly within said opening in the frame for precisely locating the axle means relative to the power output shaft.

4. The invention of claim 1, and further comprising at least two bearings carried by the axle housing means for rotatably supporting the axle means.

5. The invention of claim 1, wherein the housing is bolted to the frame of the vehicle.

6. A vehicle axle mechanism, said vehicle having a frame and at least first and second driven wheels, said mechanism comprising:
    first and second axle means coupled with respective wheels,
    first and second axle housing means for rotatably supporting respective axle means, said axle housings being rigidly coupled with the vehicle frame,
    first and second sleeve means coupled for rotation with respective axle means,
    an output shaft driven by a power source carried by the vehicle frame,
    a coupler means extending between the output shaft and the first sleeve means for transferring rotational motion therebetween,
    first and second sprockets rigidly coupled with respective sleeves,
    a chain means operatively extending between the first and second sprockets for transferring the rotational motion of the first wheel to the second wheel.

7. The invention of claim 6, wherein a portion of the first axle housing means is positioned during vehicle operation within an opening defined by the frame, said opening and portion of the first axle housing means having a common mating shape for precisely locating the first axle means relative to the output shaft.

8. The invention of claim 7, wherein a portion of the first axle housing means is positioned relatively snugly within an opening in the frame for precisely locating the first axle means relative to the power output shaft.

9. The invention of claim 6, and further comprising an adjustable tensioning means for shifting the second axle housing means with respect to the first axle housing means to thereby adjust the tension in the chain means.

10. The invention of claim 9, wherein the tensioning means further comprises a bolt means coupled with the second axle housing and extending through an opening formed in the vehicle frame,
    a nut means coupled with the bolt means and abuttable with a portion of the vehicle frame, said nut means being adjustable to vary the position of the second axle housing means relative to the first axle housing means and thereby adjust the tension in the chain means.

11. The invention of claim 6, and further comprising at least two bearings carried by each of the first and second axle housing means for rotatably supporting respective axle means.

12. The invention of claim 6, wherein the first and second axle housing means are each bolted to the frame of the vehicle.

13. The invention of claim 6, wherein the output shaft is received within a mating opening formed in the coupler means for causing the output shaft and the coupler means to rotate together during operation of the vehicle.

14. The invention of claim 13, wherein each axle means is received within a mating opening formed in respective sleeve means for causing the respective sleeve means and axle means to rotate together during vehicle operation.

15. The invention of claim 14, wherein the first sleeve means is received within a mating opening formed in the coupler means for causing the coupler means and first sleeve means to rotate together during vehicle operation.

* * * * *